Figure 1:
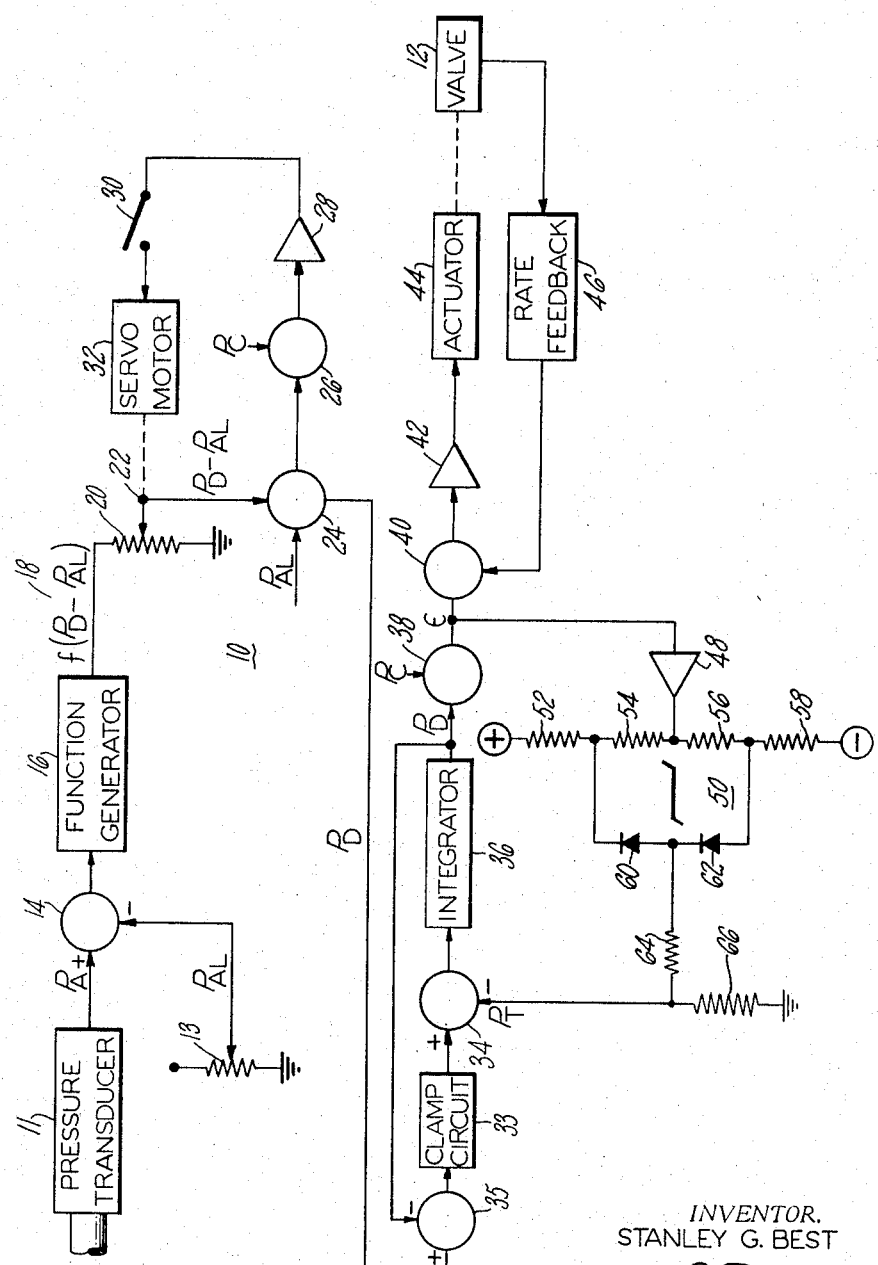

United States Patent Office 3,373,675
Patented Mar. 19, 1968

3,373,675
ELECTRONIC SCHEDULE GENERATOR TRACKING CIRCUIT AND RATE LIMITER
Stanley G. Best, Manchester, Conn., assignor to United Aircraft Corporation, East Hartford, Conn., a corporation of Delaware
Filed July 11, 1966, Ser. No. 564,226
11 Claims. (Cl. 98—1.5)

This invention relates to a control circuit wherein a reference parameter regulates a controlled parameter. More specifically it relates to an automatic aircraft cabin pressure regulator wherein the cabin pressure is controlled by a reference cabin pressure signal.

In the control of parameters such as the exhaust temperature of a gas turbine engine, or the fuel flow thereto, or the speed of a propeller, or other parameters desired to be controlled, it is often desired to schedule these parameters according to a reference signal. The reference signal follows prescribed schedules in magnitude, phase or polarity as the case may be and regulates the controlled parameter by acting upon a member that influences the controlled parameter. Proper feedback of a signal indicative of the controlled parameter into the reference signal circuit assures that the controlled parameter follows the reference signal.

It may happen, however, that the member used to influence the controlled parameter, such as the outflow valve in a cabin pressure regulator, cannot adequately adjust the controlled parameter in the direction and magnitude called for by the reference signal. In such a case, the parameter will separate from the reference to an undesirable extent and tight control of the parameter is lost.

For instance, when the reference signal is scheduled to respond within a limited rate of change as a result of a step input or where the reference signal varies slowly in a scheduled manner from an initial value to a prescribed value, it varies according to this scheduled change and thereby widens the gap between the controlled parameter if that is unable to follow the scheduled change.

In a copending application, Ser. No. 564,114, filed July 11, 1966, by Floyd R. Emmons, entitled "Cabin Pressure Regulator" and assigned to the same assignee, an automatic cabin pressure regulator is described wherein a signal indicative of the desired cabin pressure is compared with the actual cabin pressure to produce an error signal to regulate the flow of air from an outflow valve.

Examples where the controlled parameter may not be able to follow the reference signal are, for instance, as follows.

During an idle descent, it is possible that the flow of air from the engines is insufficient to pressurize the cabin according to the desired schedule. In such a case, the desired cabin pressure signal will continue to call for an increase in the actual cabin pressure while the aircraft is descending yet the actual cabin pressure signal $P_c$ is unable to follow. The error signal will therefore grow while this condition exists. When the equipment re-establishes its ability to produce the proper pressurization of the cabin, a large inflow of air into the cabin at the rate limit will occur causing a step pressure input that is quite uncomfortable to the passengers.

In the event a standby cabin pressure regulator system is used, it is important that change-overs from automatic to manual transitions occur as smoothly as possible.

It is therefore an object of this invention to maintain a standby system for the regulation of a controlled parameter tracked to the controlled parameter within prescribed limits even when it is not in use so that transients are minimized when it is directed to regulate the controlled parameter.

It is a further object of this invention to speed up the scheduled change of a reference signal used to regulate a controlled parameter to thereby limit the difference between the reference signal and the controlled parameter to a predetermined maximum.

It is still further an object of this invention to provide a device for adjusting a reference signal used to regulate and schedule a controlled parameter when the controlled parameter deviates from the reference by a predetermined amount to thereby maintain the reference and the controlled parameter within close predetermined values to one another.

It is still further another object of this invention to provide an improved cabin pressure regulator employing a schedule generator for generating a signal indicative of the desired cabin pressure and maintaining the desired cabin pressure signal within predetermined limits to that of the actual cabin pressure.

Figure 2:
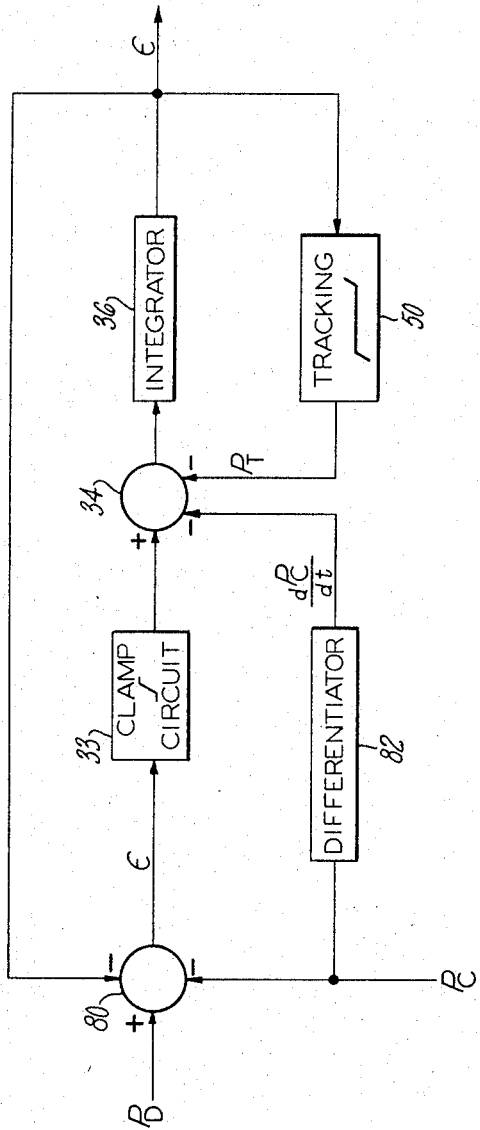

These objects and others will become more readily apparent upon a review of the drawings and the description thereof, wherein:

FIGURE 1 shows the tracking feature of this invention.
FIGURE 2 shows another rate limiter circuit in combination with a tracking circuit.

In FIGURE 1 a schedule generator generally indicated at 10 is used to generate a desired reference cabin pressure signal, $P_d$, which is compared to a signal indicative of the actual cabin pressure, $P_c$, to produce an error signal, $\epsilon$, for modulating an outflow valve 12. The outflow valve 12 influences the controlled parameter $P_c$. The schedule generator described herein provides a desired cabin pressure for the descent phase of an aircraft. It is, of course, possible as described in the copending patent application by Mr. Emmons to employ the schedule generator for generating desired cabin pressure during all of the flight phases of the aircraft such as ascent, cruise, and descent. For purposes of describing the improvement of this invention, the schedule generator is limited to the descent phase.

The pressure of the ambient environment external to the cabin is sensed by a pressure transducer, not shown, to generate a voltage indicative thereof, $P_a$. In addition, the pilot schedules a voltage, $P_{aL}$, indicative of the ambient pressure at the landing field or the termination of the descent phase. This may be done by adjusting the wiper on a potentiometer, not shown, and may also be barometrically corrected. These two signals are applied to a difference amplifier 14, the output of which will be $P_a - P_{aL}$. The difference signal is then applied to the input of a function generator 16, the output of which is designed to correspond to another difference signal, namely, the difference between the desired cabin pressure $P_d$ and a signal indicative of the cabin pressure at the termination of the descent phase $P_{aL}$. This difference signal 18 is then applied to a multiplier 20 such as the fixed terminals of a potentiometer and the output obtained from a wiper 22. The multiplied difference signal represents the expected change in cabin pressure for the particular descent flight phase. The difference signal $P_d - P_{aL}$ is then applied to a summing amplifier 24 to which is added the pressure signal indicative of the cabin pressure at the termination of the flight phase, $P_{aL}$, to produce the desired cabin pressure signal $P_d$.

The proper multiplier factor and the generation of the schedule cabin pressure difference signal is obtained by activating a servo-loop control circuit for some short time after entering the descent phase. In this servo-loop the desired cabin pressure signal $P_d$ is compared to the actual cabin pressure signal $P_c$ in the difference circuit 26 and the difference is amplified in amplifier 28 which drives a servomotor 32 through a switch 30. Switch 30 is closed for a short time after entering the descent phase by use of a time delay relay, not shown. The servomotor 32 varies the position of the wiper 22 until the error signal at the output of circuit 26 is a minimum. At the end of the delay of approximately three seconds, the switch 30 is opened and the wiper position essentially "frozen." During descent phase the $P_d$ signal is applied through a rate limiter circuit comprising difference network 35, clamp circuit 33, difference circuit 34 and integrator 36. At difference circuit 34 $P_d$ is compared with a feedback signal from a tracking loop circuit generally indicated at 50. The output of the rate limiter integrator 36 is fed back to difference circuit 35 and applied to difference circuits 38. At the latter it is compared with a signal indicative of the actual cabin pressure $P_c$.

The output of circuit 38 is an error indicative of the difference between the actual cabin pressure and the desired cabin pressure and this error signal is applied through a difference circuit 40, amplifier 42, and motor actuator 44 to modulate the valve 12 in such a manner that the error signal at the output of the difference circuit 38 is driven to a minimum value. A rate feedback signal applied through a network 46 feeds back into the difference network 40 to stabilize the valve control.

A feedback signal indicative of the eror signal $\epsilon$ is used to drive the tracking loop circuit 50. This may be obtained from either the output of the difference circuit 38 or anywhere thereafter in the loop, for instance, the output of amplifier 42 after the rate feedback has been inserted from the valve 12. The feedback signal is applied through an amplifier 48 to a deadband circuit. This deadband circuit is designed to produce an output only when the error signal into amplifier 48 exceeds a predetermined positive or negative value. At any other value within the band the $P_t$ signal is effectively zero. This is accomplished by providing a series resistor and diode network consisting of resistors 52, 54, 56 and 58. Resistor 52 is like that of 58, and 54 and 56 are the same. Hence, a symmetrical circuit is formed whereby the output of the amplifier 48 would be zero volts in the absence of any error signal. The series diode circuit consisting of diodes 60 and 62 is connected across the series combination formed by resistors 54 and 56 whereby the cathode of diode 60 is connected to the common point of resistance 52 and 54 and the anode of diode 62 is connected to the common point of resistors 56 and 58. The common terminal of the diode 60 and 62 is fed through a resistor divider network formed by resistors 64 and 66 to produce $P_t$. Resistor 66 is shown connected to ground so that in the absence of any signal beyond the deadband, $P_t$ equals zero volts.

The operation of this tracking circuit is such that when the error signal calls for a valve change that is equivalent to more than ±40 feet in altitude, the output of the amplifier 48 rises sufficiently positive or negative to forwardly bias either of the diodes 60 or 62. Ordinarily with an error signal equivalent to less than ±40 feet, both of these diodes are reverse biased. For instance, if the output of the amplifier 48 goes positive then the diode 62 will conduct when the voltage determined by the drop across resistor 56 commences to forwardly bias the diode and thus drive the $P_t$ signal positive. The polarity of the $P_t$ signal applied to difference circuit 34 will be such that it tends to reduce the desired cabin pressure signal $P_d$, and thereby prevents the error $\epsilon$ from growing too large. Consequently, the tracking loop feature described herein forces the desired pressure signal to follow the actual cabin pressure during the condition when the latter pressure is unable to follow the former.

FIGURE 2 shows a novel rate limiter circuit with a tracking circuit. The desired cabin pressure signal $P_d$ and the parameter to be controlled $P_c$ are first combined in difference circuit 80 to produce an error signal $\epsilon$ indicative of the difference between them. The feedback from the integrator 36 output is also substracted from $P_d$ in circuit 80. The error signal $\epsilon$ is then fed through the clamp circuit 33 to the difference circuit 34 where a signal indicative of the rate of change of the parameter to be controlled, $dP_c/dt$, is applied to produce a signal indicative of their difference. The tracking feedback signal $P_t$ is also applied to difference circuit 34. The output of circuit 34 is applied to the integrator 36 and its output $\epsilon$ is then applied to the actuator 44 to control the position of valve 12.

The several advantages of this type of rate limiter device are the increased sensitivity obtainable from the output of the integrator and the ability of the error to follow rapid changes in $P_c$. The placement of the rate limiter after the reference parameter $P_d$ has been compared with the parameter to be controlled $P_c$ ordinarily tends to slow its response time. By adding the differential of $P_c$ in series with the integrator 36, the output $\epsilon$ follows the rapid fluctuations of $P_c$ since the combined operations yield an output proportional to the parameter to be controlled, $P_c$.

The tracking circuit 50 provides the same function as described in relation to FIGURE 1 and assures that the error $\epsilon$ is limited in its maximum excursion to within acceptable ranges.

It is to be understood that the invention is not limited to the specific embodiment herein illustrated and described but may be used in other ways without departure from its spirit as defined by the following claims.

I claim:

1. In a pressure regulator for an aircraft cabin wherein the flow of air through an outflow valve is modulated to pressurize the cabin throughout the ascent, cruise, and descent flight phases of the aircraft and wherein the cabin pressure regulator modulates the outflow valve by comparing a desired cabin pressure voltage with a voltage indicative of the actual cabin pressure to provide an error voltage for modulating the outflow valve in a direction to match the actual cabin pressure voltage to the desired cabin pressure voltage, the improvement comprising:
   a deadband circuit coupled to the error voltage and producing a tracking voltage when the error voltage exceeds a predetermined absolute magnitude, and
   a feedback circuit responsive to the desired cabin pressure voltage and the tracking voltage for modifying the desired cabin pressure voltage in a direction to match the actual cabin pressure voltage.

2. A device as recited in claim 1 wherein the deadband circuit comprises:
   a voltage reference of a first polarity,
   and a conducting network coupled to the voltage reference and the error voltage for conducting when the absolute magnitude of the error signal exceeds said voltage reference.

3. A device as recited in claim 2 wherein the feedback circuit comprises:
   a circuit coupled to the desired cabin pressure voltage and the tracking voltage to produce an output signal indicative of the difference therebetween.

4. A device as recited in claim 1 and further comprising:
   a rate limiter circuit in series with the desired cabin pressure voltage for limiting its rate of change within a predetermined range,
      said rate limiter including a clamping circuit producing a clamped voltage, having an absolute magnitude that is limited within a predetermined range,
      a network coupled to the clamped voltage and the tracking voltage for modifying the desired cabin pressure voltage and producing an output voltage indicative of the difference therebetween, and
      an integrator circuit coupled to the difference voltage and producing an output voltage having a magnitude and a polarity indicative of a rate limited, desired cabin pressure voltage.

5. A device for limiting the error signal indicative of the difference between a parameter to be controlled and a reference parameter comprising:
- means for generating a signal indicative of a predetermined reference value of the parameter to be controlled,
- means for generating a signal indicative of the parameter to be controlled,
- means responsive to the reference signal and the signal indicative of the parameter to be controlled for producing an error signal commensurate with the error therebetween,
- a rate limiter circuit responsive to the error signal and including:
    - a clamp circuit for limiting the maximum excursions of the error signal, and
    - an integrator coupled to the clamp circuit for integrating the clamped error signal,
- means for negatively feeding back the integrated error signal to the input of the error signal producing means,
- a differentiator coupled to the signal indicative of the parameter to be controlled, and
- means applying the differentiated signal to the input of the integrator.

6. A device as recited in claim 5 and further including:
- a tracking circuit having its input coupled to the integrator output and producing a tracking output signal commensurate with its input when the integrator output signal exceeds a predetermined deadband range, and
- means applying the tracking signal to the integrator input for reducing the signal into the integrator.

7. A device as recited in claim 5 wherein:
- the reference signal generator means includes means for generating a signal indicative of the desired pressure in the cabin of an air craft, and
- where the parameter signal generator means comprises:
    - means for sensing the pressure in said aircraft cabin and producing a signal commensurate therewith.

8. A device for limiting the magnitude of an error signal indicative of the difference between a parameter to be controlled and a reference parameter comprising:
- means for generating a signal indicative of a predetermined reference value of the parameter to be controlled,
- means for generating a signal indicative of the parameter to be controlled,
- means responsive to the reference signal and the signal indicative of the parameter to be controlled for producing a signal commensurate with the error therebetween,
- means responsive to the error signal for producing a tracking signal when said error signal exceeds a predetermined value, and
- means responsive to the tracking signal for adjusting the reference signal in a manner to maintain the error signal below the predetermined value.

9. A device as recited in claim 8 wherein the error signal producing means further includes:
- a rate limiter for effectively limiting the rate of change of the reference signal to a predetermined level.

10. A device as recited in claim 9 wherein the rate limiter further includes:
- an integrator having its input coupled to the tracking signal and the error signal to produce an integrated output signal,
- and means negatively feeding back the integrated output signal to the input of the rate limiter.

11. A device as recited in claim 9 wherein the rate limiter further includes:
- an integrator having its input coupled to the tracking signal and the reference signal to produce an integrated output signal, and
- means negatively feeding back the integrated output signal to the input of the rate limiter.

References Cited

UNITED STATES PATENTS

| | | | |
|---|---|---|---|
| 2,973,702 | 3/1961 | Andresen | 98—1.5 |
| 3,152,534 | 10/1964 | Molloy | 98—1.5 |

MEYER PERLIN, *Primary Examiner.*